US005713557A

United States Patent [19]

Kang

[11] Patent Number: 5,713,557

[45] Date of Patent: Feb. 3, 1998

[54] VEHICLE JACK

[76] Inventor: Hsin-Fa Kang, 58, Ma Yuan West St., Taichung, Taiwan

[21] Appl. No.: 718,806

[22] Filed: Sep. 24, 1996

[51] Int. Cl.$^6$ .................................................. B60P 1/48

[52] U.S. Cl. .......................... 254/9 B; 254/8 B; 254/17; 254/45; 254/120; 254/131

[58] Field of Search .................................... 254/8 B, 9 B, 254/2 B, 11, 15, 17, 29 R, 30, 45, 46, 13, 116, 120, 124, 130, 131, 133 R, 129; 81/177.1, 177.2

[56] References Cited

U.S. PATENT DOCUMENTS

| | | | |
|---|---|---|---|
| 1,307,600 | 6/1919 | Rose et al. | 254/8 B |
| 1,826,110 | 10/1931 | Wickman | 254/131 |
| 4,333,617 | 6/1982 | Hamilton | 254/131 |
| 4,365,925 | 12/1982 | Girtz | 254/131 |
| 5,560,272 | 10/1996 | Bolger | 81/177.1 |

FOREIGN PATENT DOCUMENTS

| | | | |
|---|---|---|---|
| WO86/05167 | 9/1986 | WIPO | 254/9 B |

*Primary Examiner*—Timothy V. Eley
*Assistant Examiner*—Lee Wilson

[57] ABSTRACT

A jack comprises a main frame device, an extensible rod device and two wheels. The main frame device has an upright pipe, a driving rod connected to the upright pipe, a reinforced plate connected to the driving rod and the upright pipe, an upper rod inserted in the upright pipe, and an upper block mounted on the upper rod. The extensible rod device has an outer pipe, a middle pipe inserted in the outer pipe, and an inner pipe inserted in the middle pipe. An inserted end of the driving rod is inserted in a lower end of the outer pipe. Two wheels are fastened on the upright pipe pivotally.

5 Claims, 7 Drawing Sheets

VEHICLE JACK

BACKGROUND OF THE INVENTION

The invention relates to a jack. More particularly, the invention relates to a jack for a vehicle.

A conventional jack has a screw rod to be rotated upward. However, the operation of the screw rod is very slow. The conventional jack has too many elements also.

SUMMARY OF THE INVENTION

An object of the invention is to provide a jack which can lift an article fast.

Accordingly, a jack comprises a main frame device, an extensible rod device and two wheels. The main frame device has a hollow interior, an upright pipe, a driving rod connected to the upright pipe, a reinforced plate connected to the driving rod and the upright pipe, an upper rod inserted in the upright pipe, and a generally U-shaped upper block mounted on the upper rod. The extensible rod device has an outer pipe, a middle pipe inserted in the outer pipe, and an inner pipe inserted in the middle pipe. An inserted end of the driving rod is inserted in a lower end of the outer pipe. A support block is disposed beneath the driving rod. The support block has a corrugated bottom. Two parallel lobes are attached to the upright pipe. A support plate has an upper end aligned between two parallel lobes. The support plate has a corrugated bottom. A pivot pin fastens the support plate and the parallel lobes together. The upright pipe has a shaft hole and a first and second positioning holes. A shaft fastens two wheels on the upright pipe pivotally via the shaft hole. The upper rod has a through hole and a plurality of round holes. A first positioning rod fastens the upright pipe and the upper rod together. The generally U-shaped upper block has a slot and a circular hole. A second positioning rod fastens the generally U-shaped upper block and the upper rod together. A protruded block is formed at a bottom of the inner pipe. A protruded flange is formed at a bottom of the middle pipe. An upper annular recess is formed in an upper end of the outer pipe. A lower annular recess is formed in a lower end of the outer pipe. A first recess rail is formed in an inner periphery of the outer pipe between the upper annular recess and the lower annular recess to receive the protruded flange. An upper annular groove is formed in an upper end of the middle pipe. A lower annular groove is formed in a lower end of the middle pipe. A second recess rail is formed in an inner periphery of the outer pipe between the upper annular recess and the lower annular recess to receive the protruded block.

DETAILED DESCRIPTION OF THE INVENTION

Figure 1:
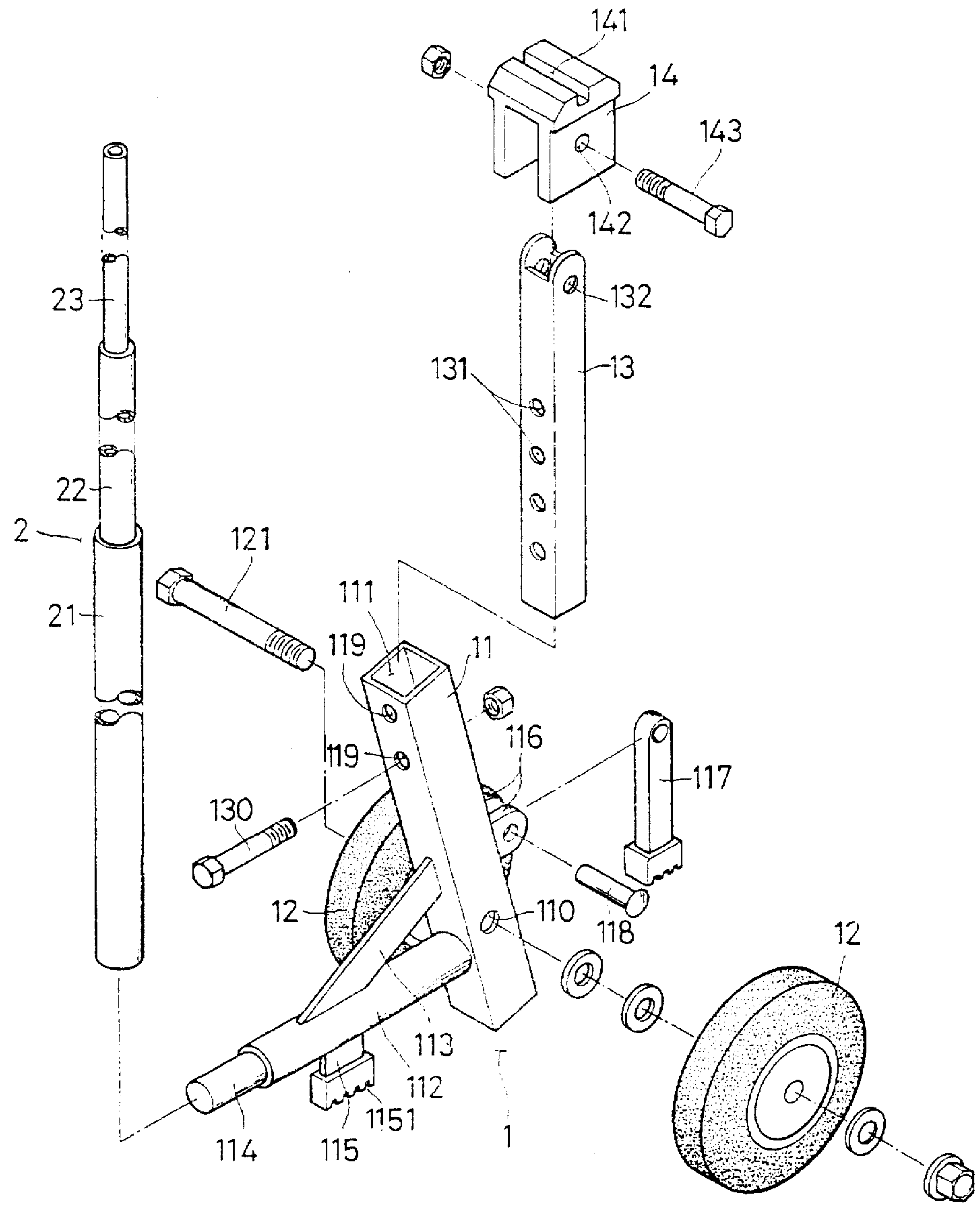
FIG. 1 is a perspective exploded view of a jack of a preferred embodiment in accordance with the invention.

Referring to FIGS. 1 to 6, a jack comprises a main frame device 1, an extensible rod device 2 and two wheels 12. The main frame device 1 has a hollow interior 111, an upright pipe 11, a driving rod 112 connected to the upright pipe 11, a reinforced plate 113 connected to the driving rod 112 and the upright pipe 11, an upper rod 13 inserted in the upright pipe 11, and a generally U-shaped upper block 14 mounted on the upper rod 13. The extensible rod device 2 has an outer pipe 21, a middle pipe 22 inserted in the outer pipe 21, and an inner pipe 23 inserted in the middle pipe 22. An inserted end 114 of the driving rod 112 is inserted in a lower end of the outer pipe 21. A support block 115 is disposed beneath the driving rod 112. The support block 115 has a corrugated bottom 1151. Two parallel lobes 116 are attached to the upright pipe 11. A support plate 117 has an upper end aligned between two parallel lobes 116. The support plate 117 has a corrugated bottom. A pivot pin 118 fastens the support plate 117 and the parallel lobes 116 together. The upright pipe 11 has a shaft hole 110 and a first and second positioning holes 119. A shaft 121 fastens two wheels 12 on the upright pipe 11 pivotally via the shaft hole 110. The upper rod 13 has a through hole 132 and a plurality of round holes 131. A first positioning rod 130 fastens the upright pipe 11 and the upper rod 13 together via the second positioning hole 119 and one of the round holes 131. The generally U-shaped upper block 14 has a slot 141 and a circular hole 142. A second positioning rod 143 fastens the generally U-shaped upper block 14 and the upper rod 13 together via the circular hole 142 and the through hole 132.

Figure 2:
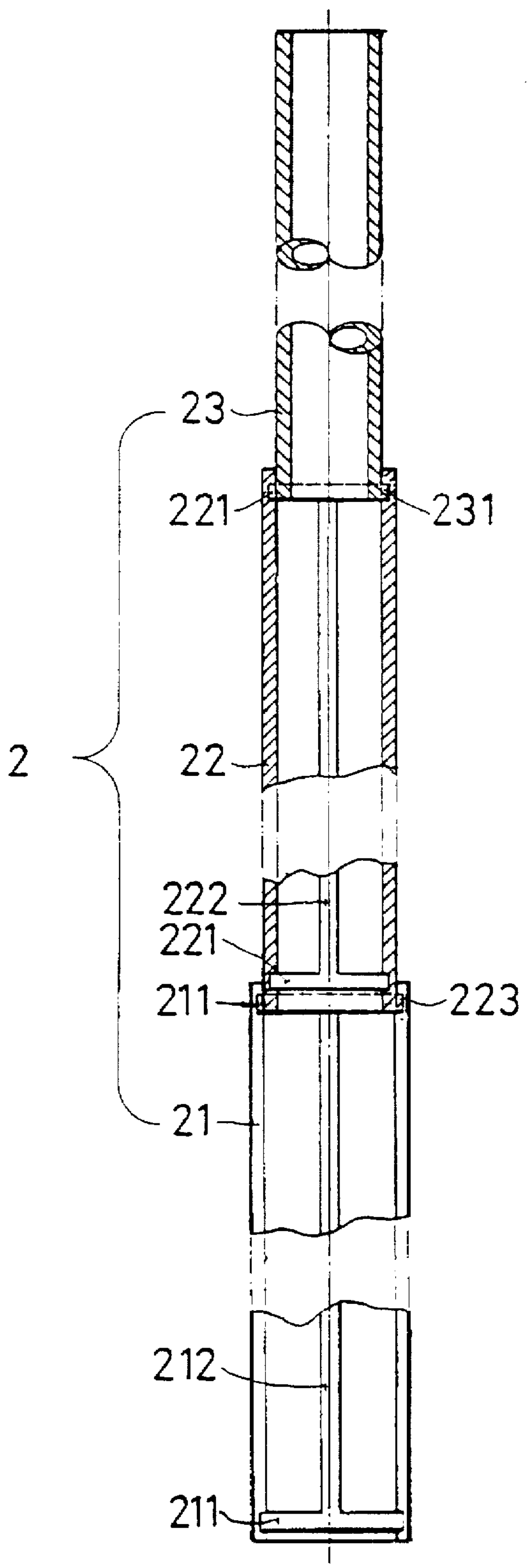
FIG. 2 is a schematic view illustrating an extension of an extensible rod device.
Figure 3:
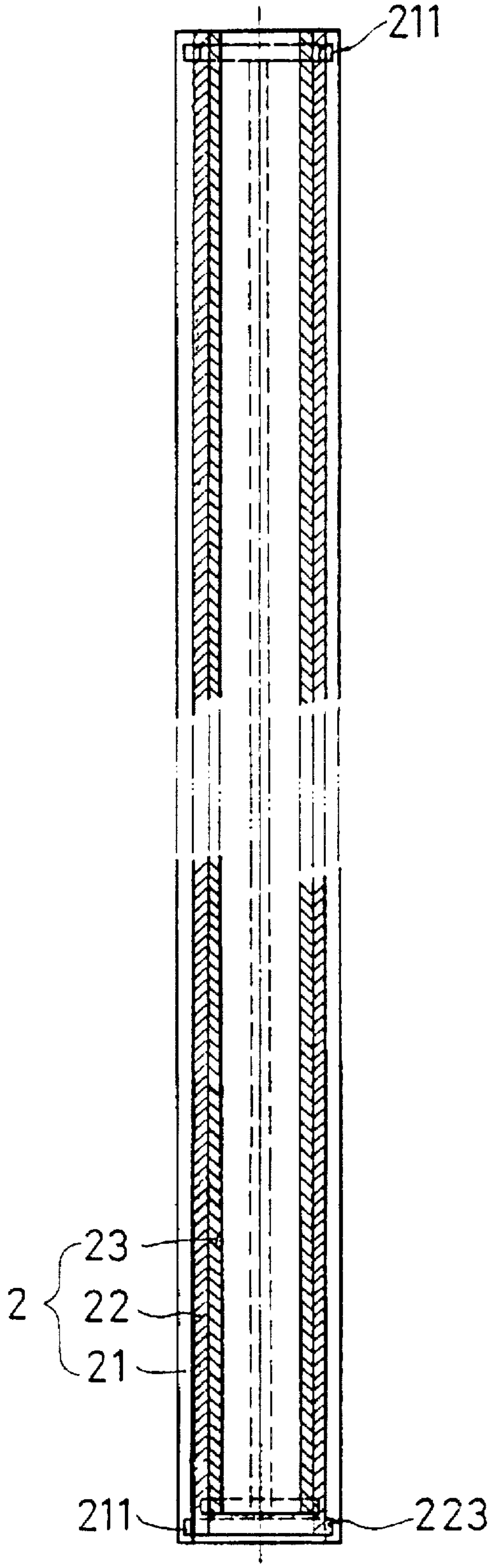
FIG. 3 is a schematic view illustrating a contraction of an extensible rod device.

Referring to FIGS. 2 and 3, a protruded block 231 is formed at a bottom of the inner pipe 23. A protruded flange 223 is formed at a bottom of the middle pipe 22. An upper annular recess 211 is formed in an upper end of the outer pipe 21. A lower annular recess 211 is formed in a lower end of the outer pipe 21. A first recess rail 212 is formed in an inner periphery of the outer pipe 21 between the upper annular recess 211 and the lower annular recess 211 to receive the protruded flange 223. An upper annular groove 221 is formed in an upper end of the middle pipe 22. A lower annular groove 221 is formed in a lower end of the middle pipe 22. A second recess rail 222 is formed in an inner periphery of the outer pipe 21 between the upper annular recess 211 and the lower annular recess 211 to receive the protruded block 231.

It is an option to provide an inserted rod 114*a* on the driving rod 112 and to insert the inserted rod 114*a* in the lower end of the outer pipe 21.

Figure 4:
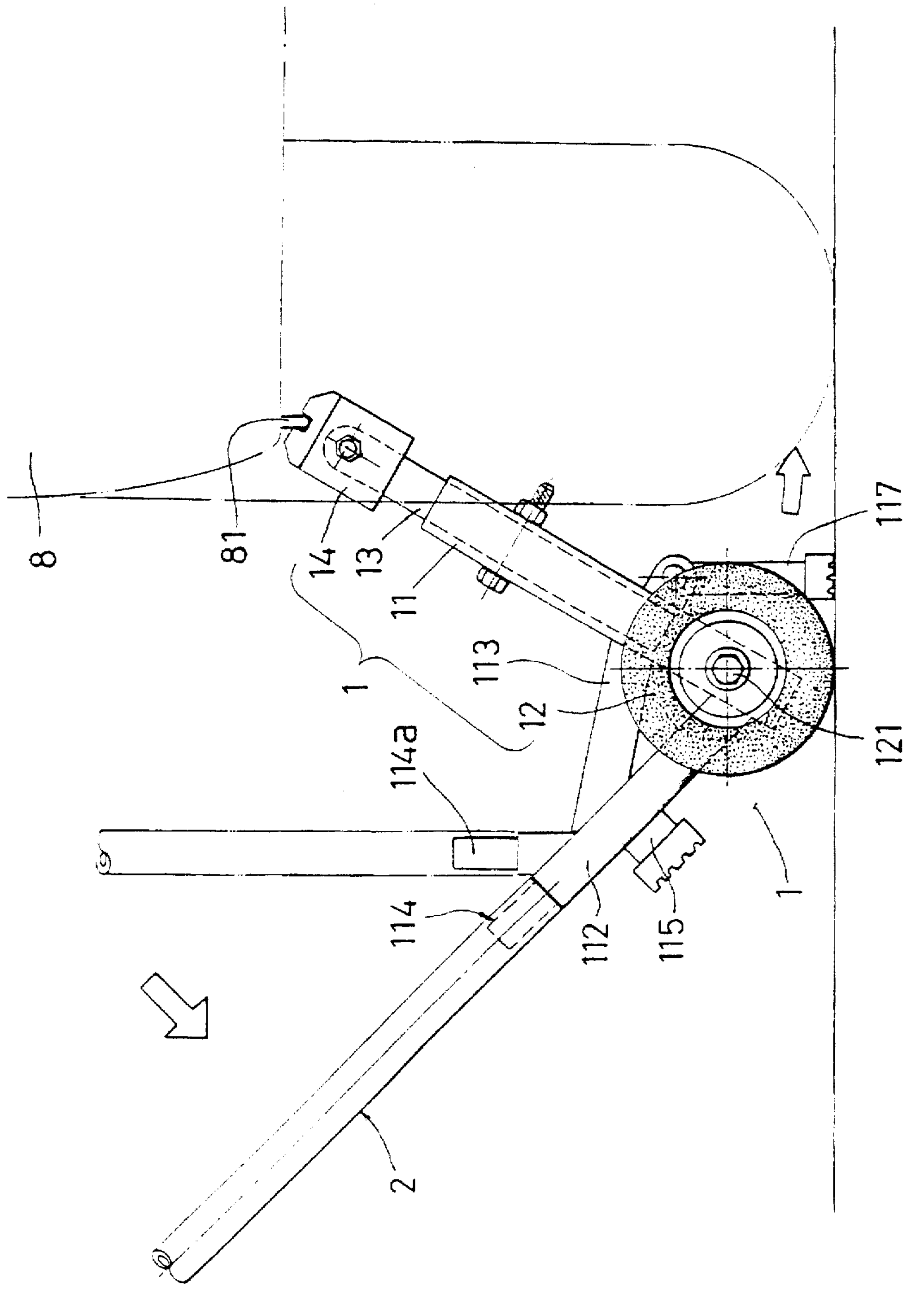
FIGS. 4, 4A, 5, 5A and 6 are schematic views illustrating operations of a jack of a preferred embodiment in accordance with the invention.
Figure 4A:
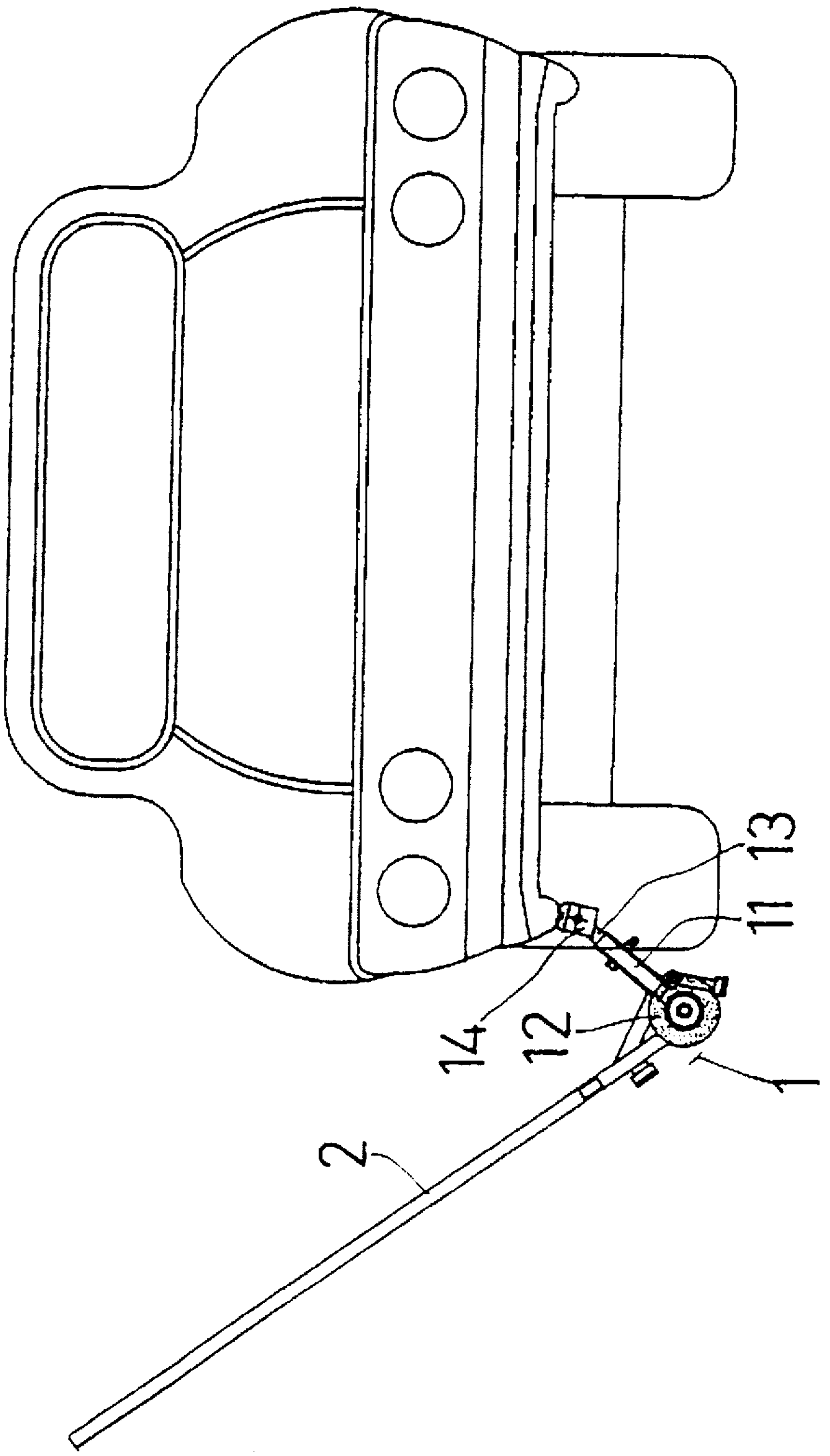
Figure 5:
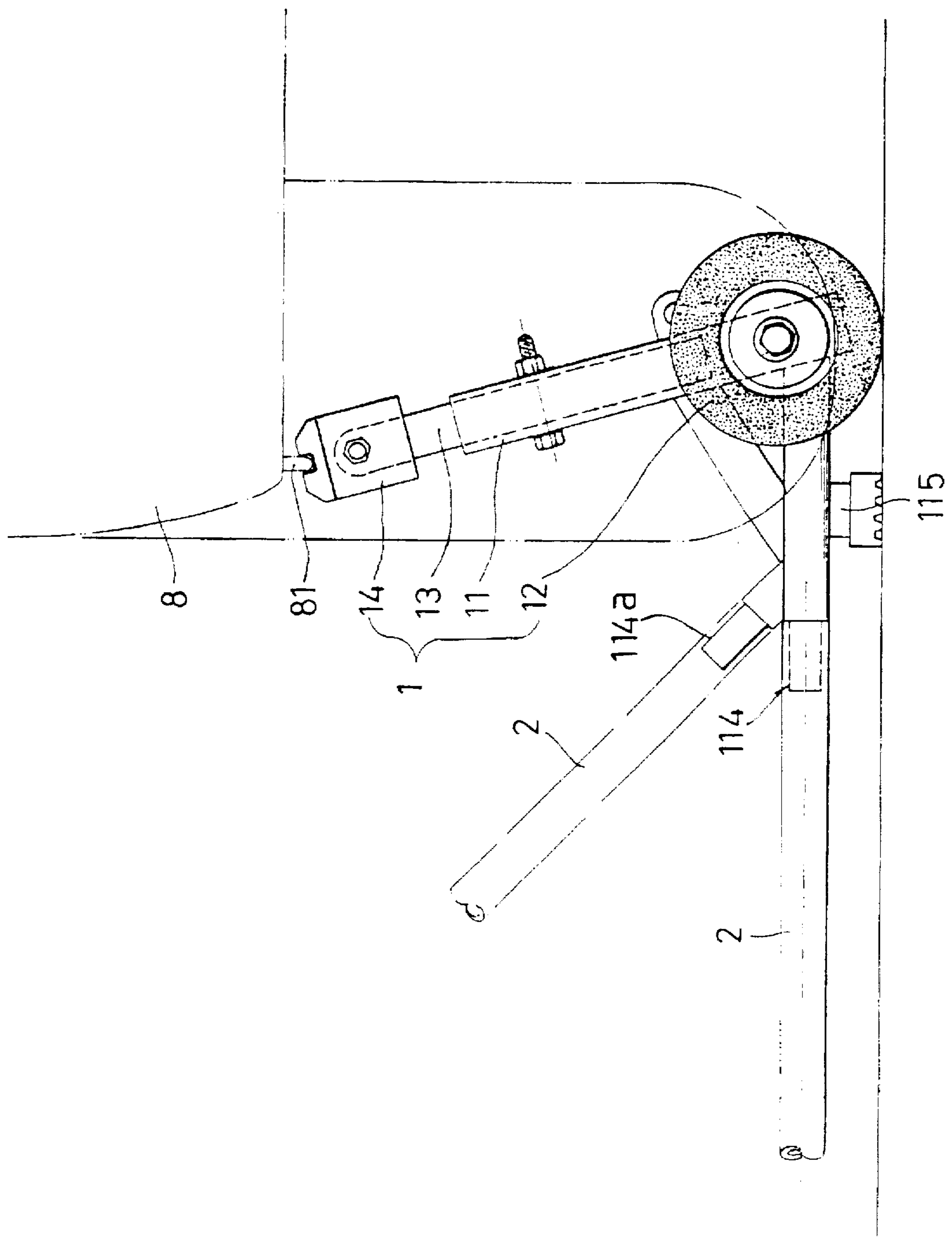
Figure 5A:
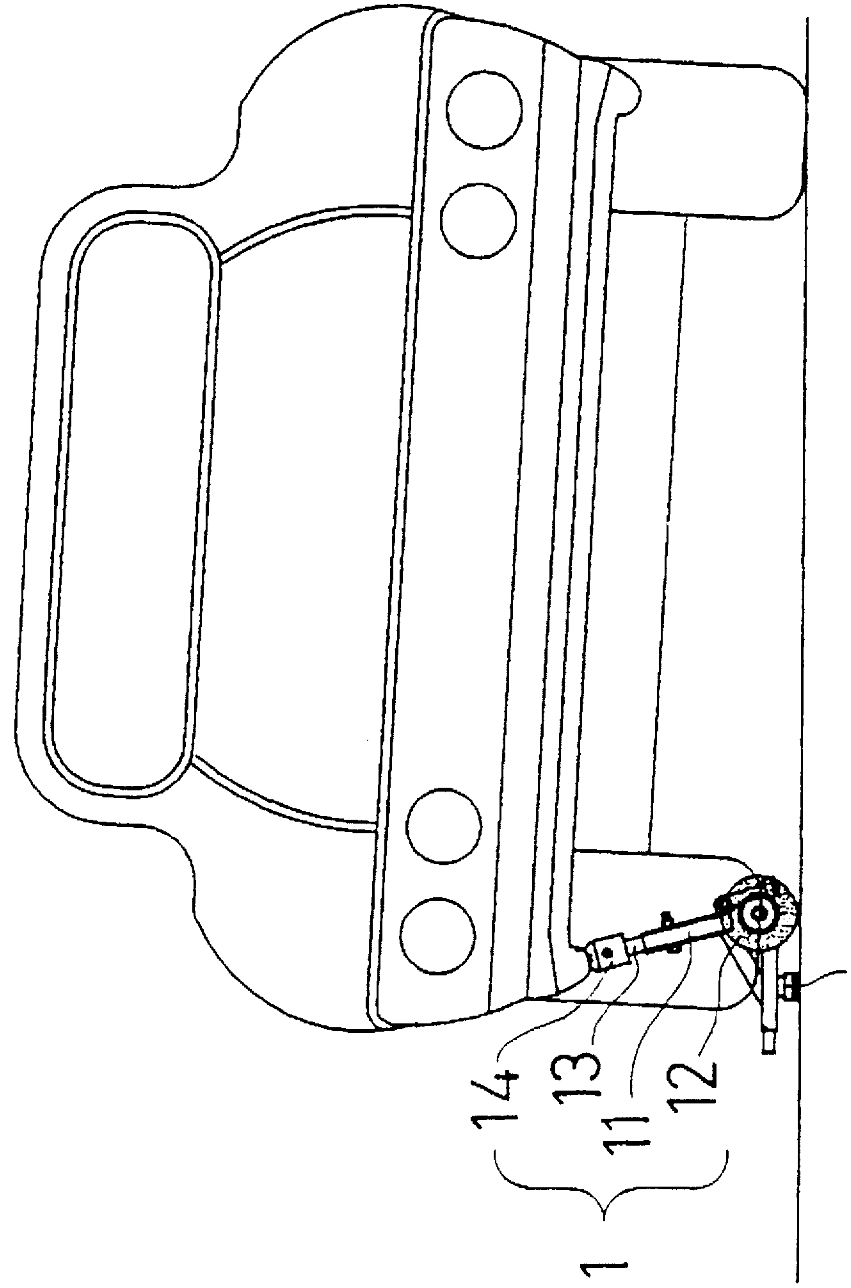
Figure 6:
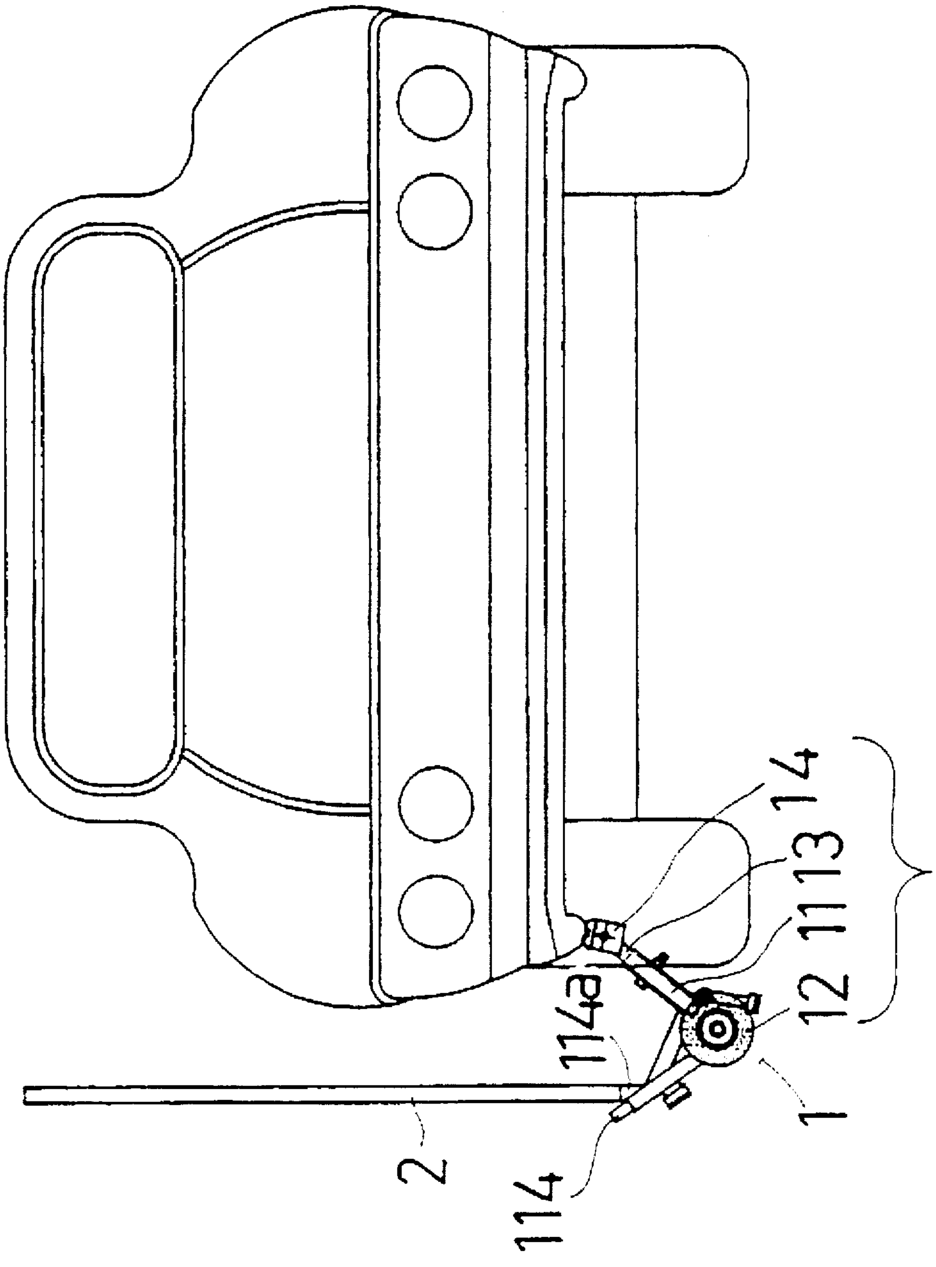

Referring to FIGS. 4 to 6, the generally U-shaped upper block 14 is placed beneath a chassis 8. The slot 141 receives a bar 81 which is disposed beneath the chassis 8. The inserted end 114 of the driving rod 112 is inserted in the lower end of the outer pipe 21. The wheels 12 are moved toward a bottom of a vehicle. The jack is operated until the support block 115 contacts the ground. The inserted rod 114*a* can be inserted in the lower end of the outer pipe 21 also.

When the jack is not used, the extensible rod device 2 can be retracted. The lower end of the outer pipe 21 can receive the inserted rod 114*a* or the lower end of the outer pipe 21 according to the working situation.

The invention is not limited to the above embodiment but various modification thereof may be made. Further, various changes in form and detail may be made without departing from the scope of the invention.

I claim:

1. A vehicle jack comprising:

a main frame device having an upright pipe, a driving rod connected to said upright pipe, an upper rod inserted in said upright pipe, and a generally U-shaped upper block mounted on said upper rod, an extensible rod device having an outer pipe, a middle pipe inserted in said outer pipe, and an inner pipe inserted in said middle pipe, a protruded flange formed at a bottom of said middle pipe, an upper annular recess formed in an upper end of said outer pipe, a lower annular recess formed in an lower end of said outer pipe, a first recess rail formed in an inner periphery of said outer pipe between said upper annular recess and said lower annular recess to receive said protruded flange, an upper annular groove formed in an upper end of said middle pipe, a lower annular groove formed in a lower end of said middle pipe, a second recess rail formed in an inner periphery of said outer pipe between said upper annular recess and said lower annular recess to receive said protruded block, said driving rod having an inserted end inserted in a lower end of said outer pipe, a support block disposed beneath said driving rod, two parallel lobes attached to said upright pipe, a support plate having an upper end aligned between said parallel lobes, a pivot pin fastening said support plate and said parallel lobes together, said upright pipe having a shaft hole and a first and second positioning holes, a shaft fastening two wheels on said upright pipe pivotally, said upper rod having a through hole and a plurality of round holes, a first positioning rod fastening said upright pipe and said upper rod together, said generally U-shaped upper block having a slot and a circular hole, a second positioning rod fastening said generally U-shaped upper block and said upper rod together, and a protruded block formed at a bottom of said inner pipe.

2. A jack as claimed in claim 1, wherein a reinforced plate is connected to said driving rod and said upright pipe.

3. A jack as claimed in claim 1, wherein an inserted rod is disposed on said driving rod.

4. A jack as claimed in claim 1, wherein said support block has a corrugated bottom.

5. A jack as claimed in claim 1, wherein said support plate has a corrugated bottom.

* * * * *